March 26, 1935.   A. SCHOPPER ET AL   1,995,586
MANUFACTURE OF PAPER
Filed Oct. 11, 1933
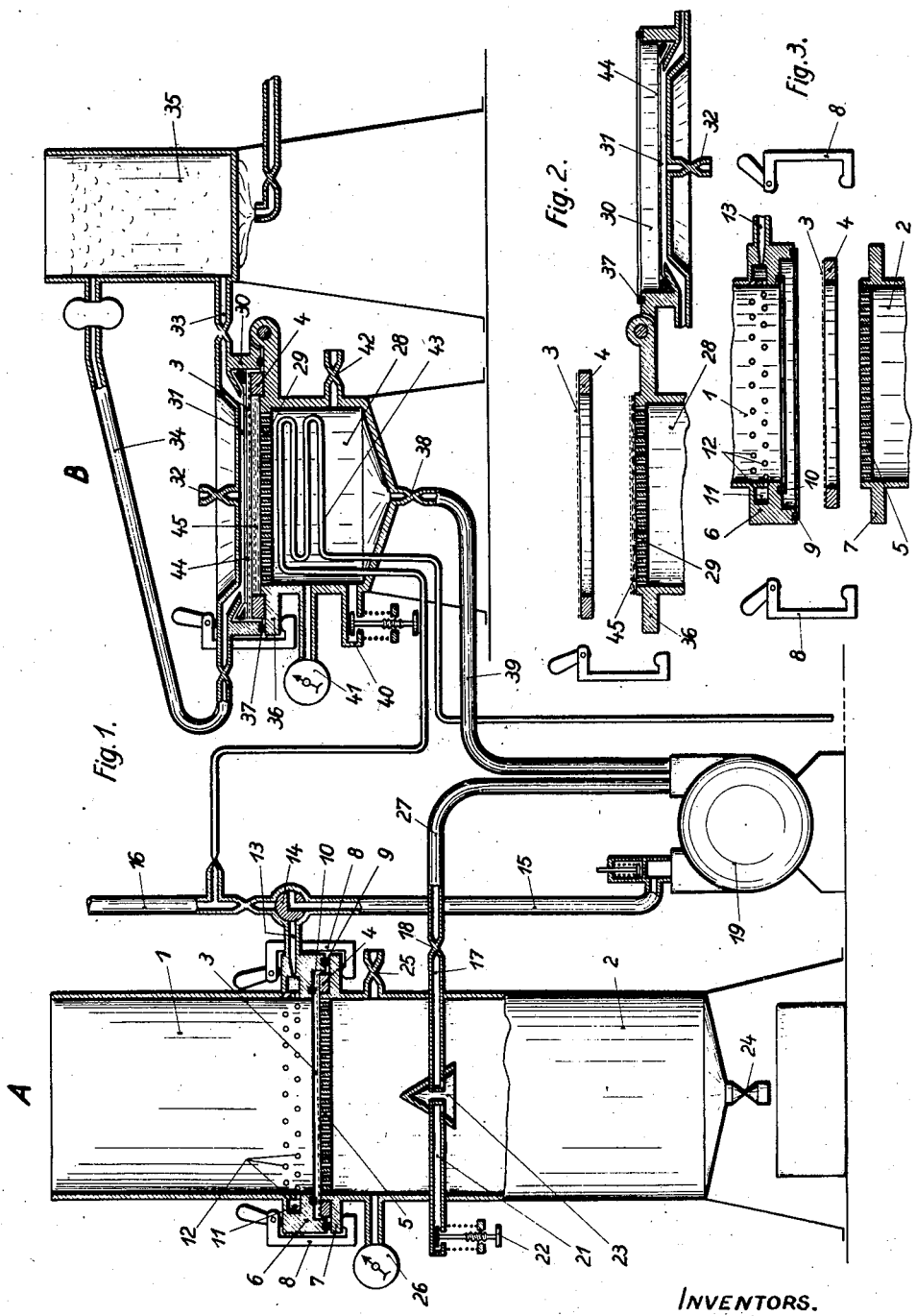
INVENTORS.
ALFRED SCHOPPER.
BRUNO POSSANNER VON EHRENTHAL.
ERNST UNGER.
ATTORNEY.

Patented Mar. 26, 1935

1,995,586

UNITED STATES PATENT OFFICE 1,995,586

MANUFACTURE OF PAPER

Alfred Schopper, Leipzig, Bruno Possanner von Ehrenthal, Kothen, and Ernst Unger, Leipzig-Marienbrunn, Germany, assignors to the firm Louis Schopper, Leipzig, Germany, a firm of Germany Application October 11, 1933, Serial No. 693,196 In Germany February 1, 1933

22 Claims. (Cl. 92—39)

The invention relates to the manufacture of test sheets of paper, that is to say sheets of paper intended for use in tests of tensile strength, creasing, size and ink absorption and so on. It is highly important that such sheets should be very uniform in regard to texture, thickness and composition, and frequently a satisfactory degree of uniformity is not obtained when the sheet is made by the usual process of depositing the pulp on a wire cloth or equivalent sieve and then removing it from the sieve for the purpose of completing the drying.

According to our invention the sheet is dried, by pressing, and heating, on the sieve on which it is formed. The operation of transferring the wet sheet from the sieve to a drying appliance is thus dispensed with, and this removes a serious cause of lack of uniformity in the finished sheet.

An example of apparatus according to our invention is shown in the annexed drawing, in which Fig. 1 is a vertical section thereof, and Figs. 2 and 3 show details thereof in section.

The apparatus comprises a sheet forming part A and a drying part B. The part A comprises a vessel 1, into which a mixture of pulp and water is introduced, and a suction chamber 2 below the vessel. Between the vessel 1 and chamber 2 a sieve 3 in a frame 4 rests on a perforated plate 5. The plate forms the bottom of the vessel, its rim lying on an external flange 7 at the top of the suction chamber 2. A flanged ring 6 fixed externally to the vessel 1 is pressed against the flange 7 by clamps 8, a washer 9 being interposed between the ring 6 and the flange. There is also a washer 10 between the ring 6 and the sieve 3. The ring 6 has two flanges, with a cavity 11 between them, forming an annular chamber around the lower part of the vessel 1, the wall of which has numerous small perforations 12 opening into the chamber. A pipe 13 is connected to the annular chamber 11, and can be connected by a two-way cock 14 to a compressed air pipe 15 and a water pipe 16 alternatively.

A suction pipe 17 controlled by a stop cock 18 extends into the chamber 2, and is connected by a pipe 27 to the suction side of a rotary blower 19, the delivery side of which is connected to the pipe 15. A pipe 21 extends into the chamber 2 in line with the pipe 17, and has an automatic spring loaded air inlet valve 22 at its outer end. The inner ends of the pipes 17 and 21 face each other in the chamber 2 within a hollow cone 23 protecting them from water which is sucked through the sieve 3 and perforated plate 5 into the chamber 2, which has a drain cock 24 at the bottom. A cock 25 enables air to be admitted to the chamber 2, and the chamber is provided with a pressure gage 26.

At the start air is admitted to the chamber 2 by opening the cock 25, and the cock 14 is set for admitting water to the annular chamber 11. This water issues with considerable velocity in the form of the jets through the perforations 12 into the vessel 1, into which pulp, already mixed with some water, is introduced. The jets agitate the pulp and produce a very uniform mixture of pulp and water, but a swirl or eddy motion is set up, and the mixture must be allowed to come to rest before withdrawal of water begins, as otherwise the fibre will tend to settle on the sieve in streaks. The swirl is stopped by setting the valve 14 so that the pipe 13 is connected to the air pressure pipe 15, causing streams of bubbles to rise from the perforations 12 through the mixture of pulp and water.

The cock 14 is then closed and the cock 18 opened, so that air is sucked from the chamber 2. Prior to this the surface tension of the water in the sieve 3 prevents penetration of water into the chamber 2, but when suction is started water does penetrate the sieve and fibres are uniformly deposited on the sieve.

By means of the automatic inlet valve 22 a uniform partial vacuum is maintained in the chamber 2, and as the cross section of this chamber is equal to that of the vessel 1 the drainage through the sieve is very regular and steady, causing little or no agitation of the fibres above the sieve. There is no outflow of water from the suction chamber 2 while the suction is proceeding.

When the suction has removed from the mixture so much of the water as it is deemed desirable to separate by this means the cock 18 is closed and air is admitted to the chamber 2 by means of the cock 25, the drain cock 24 being opened to allow the water to run out.

The clamps 8 are then unfastened, and the sieve 3 with its frame 4 is transferre to the drier B.

In the drier B there is a chamber 28 with a perforated top plate 29, upon which are laid several wire cloths 45, graduated in respect of the sizes of their mesh. The sieve 3 is placed on the uppermost wire cloth 45, and a hinged lid 30 is then closed down upon it. The lid 30 is hollow, its under part, when closed, consisting of an elastic diaphragm 31, e. g. of rubber, which may be faced with close meshed wire or silk fabric 44 to prevent adhesion of the paper. There is a packing 37 at the rim of the lid for making a tight joint with an external flange 36 on the wall of the chamber 28. The hollow lid has a vent cock 32, and the cavity therein communicates by means of pipes 33, 34 respectively with the lower part and the upper part of a hot water container 35. A cock 38 enables the interior of the chamber 28 to be placed in communication with a pipe 39 leading to the suction side of the blower 19. The chamber 28 has an air inlet controlled by an automatic spring loaded valve 40. There is a gage 41 for indicating the pressure in the chamber 28. Within the chamber 28 there is a coil 43 connected to the water pipe 16, for cooling the chamber when required.

When the lid 30 has been fastened down on the sieve, on which the sheet of paper lies, the cock 38 is opened for producing a partial vacuum in the chamber 28, and hot water from the container 36 is passed under substantially atmospheric pressure through the hollow lid 30. The partial vacuum created in the chamber 28 causes the diaphragm 31 to be pressed upon the paper, uniformly compressing the fibres, and at the same time the hot water heats the paper, causing the moisture therein to be evaporated, the vapor, or the resultant water of condensation, passing out through the pipe 39. The cooling of the chamber 28 by the coil 43, resulting in condensation of the vapor, has the advantage of reducing the volume of the moisture which has to be carried away by the pipe 39, and the condensation may be capable of maintaining an adequate degree of vacuum in the chamber 28 with the cock 38 closed. The pressure applied to the paper by the diaphragm is very evenly distributed, by reason of the wire cloths 45, of graduated mesh, which support the sieve.

An alternative mode of operation consists in passing hot water through the hollow lid at a pressure exceeding atmospheric pressure, and removing the vapor by passing air through the chamber 28.

The drying of the sheet generally occupies only a few minutes. Then the cock 38 is closed and the cock 42 opened, and after opening the lid the sheet of paper can be taken from the sieve or from the diaphragm if, as is generally found to be the case, it has become detached from the sieve and is lightly adhering to the fabric facing 44 of the diaphragm.

What we claim as our invention and desire to secure by Letters Patent of the United States is:—

1. The process of manufacturing a test sheet of paper, consisting in depositing paper pulp on a sieve, removing water from the deposited pulp by suction, whereby a wet sheet is produced on the sieve, and drying the sheet, without removal thereof from the sieve, by concurrent heating and pressure.

2. The process of manufacturing a test sheet of paper, consisting in supporting a mixture of paper pulp and water on a sieve which at normal pressure above and below it retains the water, producing a partial vacuum below said sieve and maintaining said vacuum substantially constant till extraction of water from said mixture through said sieve has left a wet sheet of pulp on said sieve, and drying said sheet, without removal thereof from said sieve, by concurrent pressure and heating.

3. The process of manufacturing a test sheet of paper, consisting in depositing paper pulp on a sieve, removing water from the deposited pulp by suction, whereby a wet sheet is produced on the sieve, and drying the sheet, by placing an elastic diaphragm upon it, without removal from the sieve, and heating and pressing the sheet by means of hot liquid applied under pressure to the diaphragm.

4. The process of manufacturing a test sheet of paper, consisting in depositing paper pulp on a sieve, removing water from the deposited pulp by suction, whereby a wet sheet is produced on the sieve, and drying the sheet by heating the sheet on the sieve and concurrently applying pressure to the sheet by placing upon it an elastic diaphragm and causing liquid under pressure to act on said diaphragm.

5. The process of manufacturing a test sheet of paper, consisting in depositing paper pulp on a sieve, removing water from the deposited pulp by suction, whereby a wet sheet is produced on the sieve, and drying the sheet by heating the sheet on the sieve and removing the vapor generated by downward suction through the sieve, and concurrently applying pressure to the sheet by placing upon it an elastic diaphragm and causing liquid under pressure to act on said diaphragm.

6. The process of manufacturing a test sheet of paper, consisting in depositing paper pulp on a sieve, removing water from the deposited pulp by suction, whereby a wet sheet is produced on said sieve, and drying said wet sheet by heating it on the sieve and concurrently applying pressure to the sheet, the pressure being applied by placing upon the sheet an elastic diaphragm and a protective elastic sheet interposed between said diaphragm and the paper sheet, and causing liquid under pressure to act on said diaphragm.

7. The process of manufacturing a test sheet of paper, consisting in depositing paper pulp on a sieve, removing water from the deposited pulp by suction, whereby a wet sheet is produced on the sieve, and drying the sheet, by heating the sheet on the sieve and removing the vapour generated by downward suction through the sieve, condensing said vapour by cooling below the sieve, and concurrently applying pressure to the sheet by placing upon it an elastic diaphragm and causing liquid under pressure to act on said diaphragm.

8. Apparatus for manufacturing test sheets of paper comprising in combination a pulp container having a sieve bottom adapted to support and drain a layer of pulp, the wall of said container having numerous small holes distributed around the lower part thereof, means for injecting water through said holes into said container, and means for injecting air through said holes into said container.

9. Apparatus for manufacturing test sheets of paper, comprising in combination a container for pulp having a detachable sieve bottom adapted to support and drain a layer of pulp, the wall of said container having numerous holes distributed around the lower part thereof, an open topped chamber having at the top an external flange for supporting said container, a ring having two inwardly directed flanges surrounding the perforated part of said container wall, clamps clamping said ring upon the flange of said chamber, means for injecting water and air alternately into the cavity between the flanges of said ring, so that said water and air enter said container, and means for exhausting air from said chamber.

10. Apparatus for manufacturing test sheets of paper, comprising in combination a container for pulp having a detachable sieve bottom adapted to support and drain a layer of pulp, the wall of said container having numerous holes distributed around the lower part thereof, an open topped chamber having at the top an external flange for supporting said container, said container and said chamber being of the same cross section throughout their respective heights, a ring having two inwardly directed flanges surrounding the perforated part of said container wall, clamps clamping said ring upon the flange of said chamber, means for injecting water and air alternatively into the cavity between the flanges of said ring, so that said water and air enter said container, and means for exhausting air from said chamber.

11. Apparatus for measuring test sheets of paper, comprising in combination a container for pulp having a detachable sieve bottom adapted to support and drain a layer of pulp, the rim of said sieve being imperforate and projecting beyond the circumference of the container wall, an open topped chamber having at the top a seat for supporting said container, a ring round the bottom of said container having parts which face respectively the sieve rim and said seat, and two elastic packing rings interposed between the first mentioned ring and the sieve rim and said seat respectively.

12. Apparatus for manufacturing test sheets of paper, comprising in combination a container for pulp having a detachable sieve bottom adapted to support and drain a layer of pulp, the wall of said container having numerous holes distributed around the lower part thereof, an open topped chamber having at the top an external flange for supporting said container, said chamber having a capacity at least equal to the capacity of said container, a ring having two inwardly directed flanges surrounding the perforated part of said container wall, clamps clamping said ring upon the flange of said chamber, means for injecting water and air alternatively into the cavity between the flanges of said ring, so that said water and air enter said container, and means for exhausting air from said chamber.

13. Apparatus for manufacturing test sheets of paper, comprising in combination a container for pulp having a detachable sieve bottom adapted to support and drain a layer of pulp, the wall of said container having numerous holes distributed around the lower part thereof, an open topped chamber having at the top an external flange for supporting said container, a ring having two inwardly directed flanges surrounding the perforated part of said container wall, clamps clamping said ring upon the flange of said chamber, means for injecting water and air alternatively into the cavity between the flanges of said ring, so that said water and air enter said container, and means for exhausting air from said chamber, said air exhausting means including a suction pipe extending into said chamber, and a cover above said pipe preventing access thereto of water from said sieve.

14. Apparatus for manufacturing test sheets of paper comprising in combination a sieve adapted to support a layer of pulp, means for sucking water downwards through said sieve, and means for heating and pressing a layer of pulp on said sieve.

15. Apparatus for manufacturing test sheets of paper, comprising in combination a sieve adapted to support a layer of pulp, a chamber having means for supporting said sieve therein, means for applying pressure to pulp placed on said sieve in said chamber, and for concurrently heating said pulp, means for exhausting air from said chamber below said sieve, and a cooling appliance in said chamber for condensing below said sieve vapor generated by the heating of said pulp.

16. Apparatus for manufacturing test sheets of paper comprising in combination a sieve adapted to support a layer of pulp, an elastic diaphragm adapted to be placed over a layer of pulp supported by said sieve, means for applying hydraulic pressure and heat to said diaphragm on said pulp, and means for sucking downwards through said sieve vapor generated by the heating of said pulp.

17. Apparatus for manufacturing test sheets of paper comprising in combination a sieve adapted to support a layer of pulp, an elastic diaphragm adapted to be placed over a layer of pulp supported by said sieve, said diaphragm having a bottom sheet of material to which said pulp does not adhere, means for applying hydraulic pressure and heat to said diaphragm on said pulp, and means for sucking downwards through said sieve vapor generated by the heating of said pulp.

18. Apparatus for manufacturing test sheets of paper comprising in combination a sieve adapted to support a layer of pulp, a chamber having a hollow cover, the under portion of said cover being an elastic diaphragm and said chamber having means for supporting said sieve therein under said cover, means for introducing hot liquid into said cover and thereby pressing said diaphragm against pulp on said sieve, and means for exhausting from said chamber air and vapor generated by the heating of said pulp by said liquid.

19. Apparatus for manufacturing test sheets of paper comprising in combination a sieve adapted to support a layer of pulp, a chamber having a hollow cover, the under portion of said cover being an elastic diaphragm and said chamber having means for supporting said sieve therein under said cover, means for introducing hot liquid into said cover and thereby pressing said diaphragm against pulp on said sieve, means for exhausting from said chamber air and vapor generated by the heating of said pulp by said liquid, and a cooling appliance for condensing said vapor in said chamber.

20. Apparatus for manufacturing test sheets of paper comprising in combination a sieve adapted to support a layer of pulp, a stack of wire cloths having respectively meshes of different sizes adapted to be placed on a layer of pulp on said sieve, an elastic diaphragm adapted to be placed on said stack of wire cloths, means for applying hydraulic pressure and heat to said diaphragm, and means for sucking downwards through said sieve vapor generated by heating said pulp.

21. The process of manufacturing a test sheet of paper, consisting in introducing a measured quantity of paper pulp into a vessel having a sieve at the bottom thereof, producing a mixture of said paper pulp with water by introducing jets of water into said vessel directly above said sieve, said jets being directed towards the central axis of said vessel, removing water from said mixture by suction which causes a wet sheet to be produced on said sieve, and drying said sheet, without removal from said sieve, by concurrent heating and pressure.

22. The process of manufacturing a test sheet of paper, consisting in introducing a measured quantity of paper pulp into a vessel having a sieve at the bottom thereof, producing a mixture of said paper pulp with water by introducing jets of water into said vessel directly above said sieve, said jets being directed towards the central axis of said vessel, then introducing into said vessel jets of air directly above said sieve, directed towards the central axis of said vessel, for stopping the whirling motion of said mixture, removing water from said mixture by suction which causes a wet sheet to be produced on said sieve, and drying said sheet, without removal from said sieve, by concurrent heating and pressure.

ALFRED SCHOPPER.
BRUNO POSSANNER von EHRENTHAL.
ERNST UNGER.